March 30, 1937.    L. NIKA    2,075,404
TRANSMISSION GEARING
Filed March 16, 1934    3 Sheets-Sheet 1
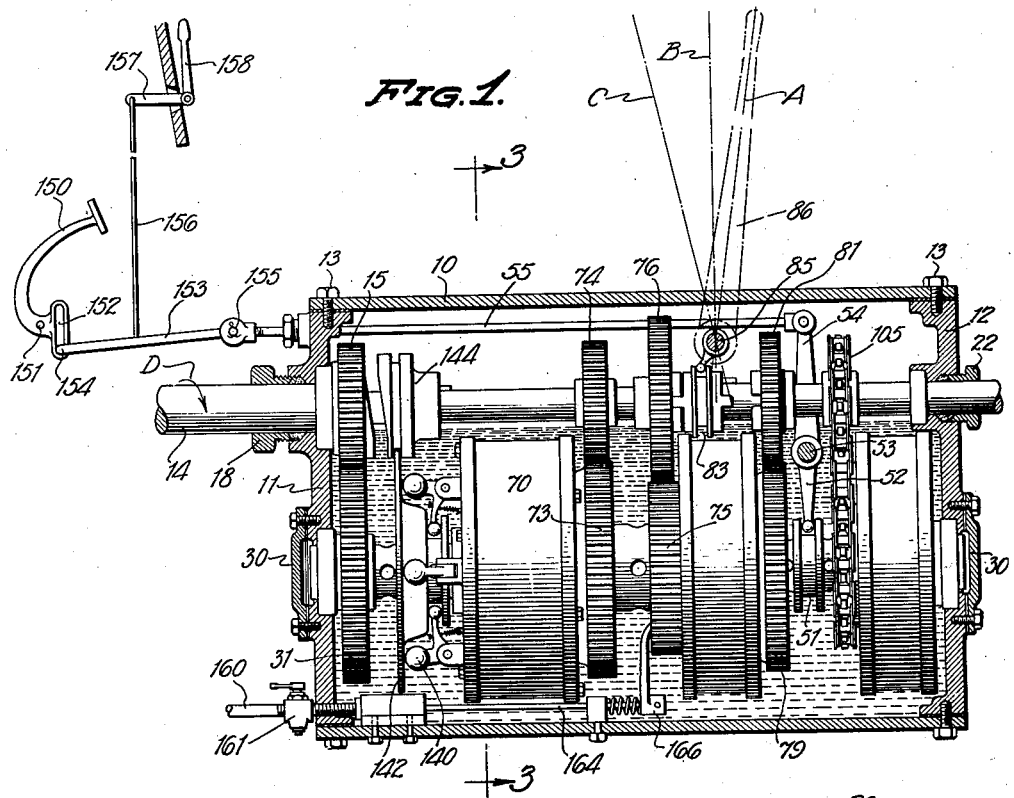
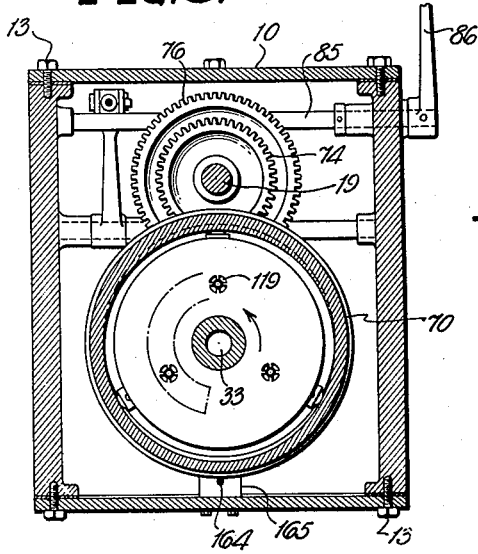
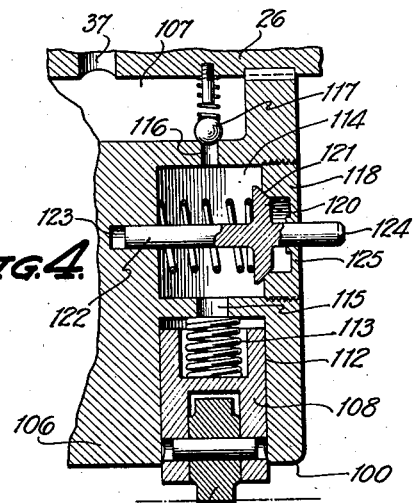
WITNESS:
INVENTOR
LOUIS NIKA.
BY
Ely & Pattison.
ATTORNEYS

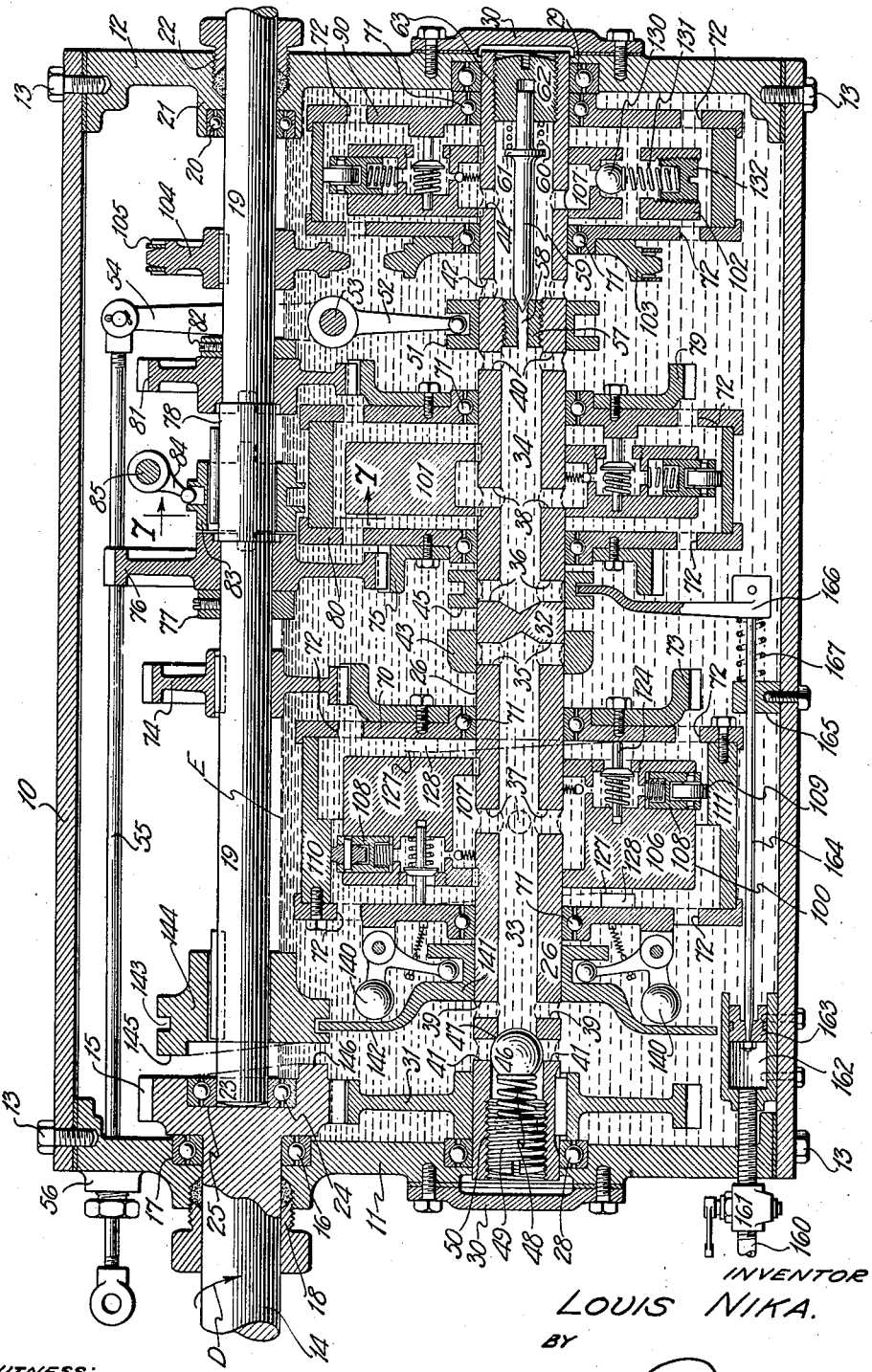

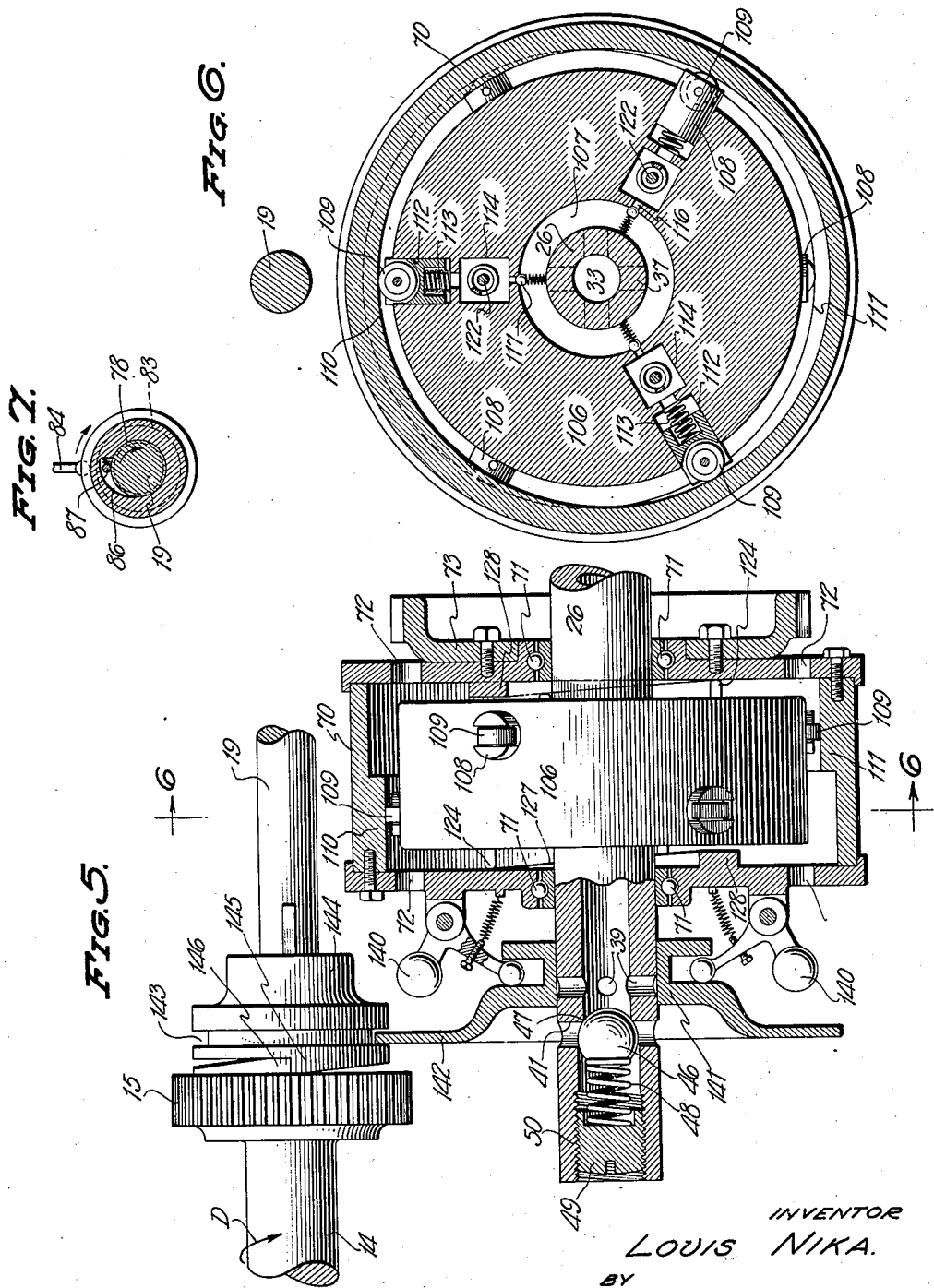

Patented Mar. 30, 1937

2,075,404

UNITED STATES PATENT OFFICE 2,075,404

TRANSMISSION GEARING

Louis Nika, New York, N. Y.

Application March 16, 1934, Serial No. 715,818

7 Claims. (Cl. 74—336)

This invention relates to new and useful improvements in power transmission gearings, and more particularly it pertains to transmission gearings of the speed changing and reverse driving type. In the present application, the invention is illustrated in a transmission gearing which is in part selective and in part progressive in its speed changing operation. It is to be understood, however, that the invention is not limited to transmission gearings of the progressive, selective or other types.

It is the object of the present invention to improve the construction and mode of operation of transmission gearings, and so to construct such devices that their operation will be materially simplified.

Many transmission gearings as at present constructed, and particularly those employed in automotive vehicles are difficult of operation without a so-called clashing of the gears. This clashing of the gears results in a chipping of the gears and often in even the more serious damage of stripping or partial stripping of the gears. Furthermore, transmission gearings as often constructed are noisy in operation.

A feature of the present invention resides in a novel construction and arrangement of parts whereby the driving gears of a transmission whether operative or inoperative as driving or driven gears, are at all times in mesh, thus eliminating the necessity of effecting an intermeshing of two or more gears to obtain a change in the speed or direction of drive.

Another feature of the invention resides in a novel construction and arrangement of parts whereby a cushioned driving connection between the driving element and the driven element is obtained when changing from the lower speeds to the higher speeds and in initial starting in the low speed.

Still another feature of the invention resides in a novel construction and arrangement of parts whereby, although in the lower speeds and in the reverse drive the several changes are selective and manually controlled, the driving connection to drive at so-called high speed, is direct in its drive and is automatically controlled.

Still another feature of the invention resides in a novel construction which provides an emergency low speed forward driving connection which, although ordinarily not in use, may be employed at will when road or load conditions seem to warrant.

Still a further feature of the invention resides in a novel construction whereby the operating driving connection is effected by means of a fluid such as oil or the like which in accordance with the present invention, is circulated freely throughout the transmission mechanism when the several parts thereof are in their neutral or non-driving positions and which is checked in its flow to effect a driving connection between the driving and driven parts of the transmission.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings,

Figure 1 is a view showing a transmission mechanism constructed in accordance with the present invention, the casing of the transmission being illustrated in longitudinal section, with the internal parts shown in elevation, Figure 2 is a substantially central longitudinal sectional view on an enlarged scale, showing the several parts in their neutral position, Figure 3 is a transverse sectional view taken substantially on the line 3—3 of Figure 1, Figure 4 is an enlarged detail sectional view, Figure 5 is an enlarged fragmentary view showing the parts, partly in section and partly in elevation, the parts shown being illustrated in high speed driving connection, Figure 6 is a vertical sectional view, taken substantially on the line 6—6 of Figure 5, and Figure 7 is a detail sectional view taken substantially on the line 7—7 of Figure 2.

Referring by reference characters to the accompanying drawings, wherein I have illustrated one type of transmission in which my invention may be embodied, the reference character 10, designates a casing having end walls 11 and 12, which are preferably removable and which may be secured in position to close the ends of the casing by suitable fastenings 13, herein illustrated as cap screws.

A driving shaft designated 14, leads into the casing preferably through the end wall 11, and on its inner end, this driving shaft is provided with a driving gear 15. This driving shaft 14, may be supported in a bearing 16, preferably of the anti-friction type suitably mounted in a bearing seat 17, in the end wall 11, of the casing.

A stuffing box 18, is provided at the point where the driving shaft 14, enters the end wall 11, of the casing.

Leading into the casing 10, through the end wall 12, thereof, there is a driven shaft 19, which may be supported at the end wall 12, by an anti-friction bearing 20, mounted in a bearing seat 21, in the end wall 12. A stuffing box 22, may be employed at the point where the driven shaft enters the end wall 12 of the casing. This driven shaft 19, may be suitably connected to any mechanism which it may be desired to drive. The inner end of this driven shaft is designated 23, and as shown, is preferably supported by an anti-friction bearing 24, carried by a bearing seat 25, formed in the gear 15, of the driving shaft 14, it being understood that when this construction is employed, the driving shaft and driven shaft are arranged in axial alinement.

A countershaft 26 extends throughout the length of the casing 10, and is supported at its ends in anti-friction bearings 28 and 29, carried respectively by the end walls 11 and 12 of the casing. The ends of the countershaft 26 may be enclosed by removable cap plates 30. Keyed to the countershaft 26, there is a countershaft driving gear 31, which meshes with the gear 15 of the driving shaft 14. By these two gears 15 and 31, the countershaft 26 will be driven at all times when the driving shaft 14 is in operation.

The countershaft 26 is hollow except, for a central partition 32, which serves to divide the hollow countershaft into two chambers 33 and 34. The chamber 33 has four series of ports which lead preferably radially through the countershaft, said series reading from right to left in Figure 2, being designated 35, 37, 39, and 41. The chamber 34 has five series of ports which are similar to the ports of the chamber 33 reading from left to right in Figure 2, these series of ports are designated 36, 38, 40, 42, and 44. A collar 43, slidably mounted on the countershaft 26 and provided with a series of ports 45, is adapted to control the opening and closing of ports 35, and 36, in a manner and for a purpose to be hereinafter described.

The ports 41 are adapted to be opened and closed by means of a suitable check valve 46, forced to a seat 47, by a coil spring 48, the tension of which is regulated by a plug 49, having threaded engagement as at 50, with the interior of the counter shaft 26. The ports 40 and 42, are opened and closed by means of a collar 51, which is slidable on the countershaft 26 by a crank 52, mounted on a shaft 53.

The crank or lever 52, may be rocked by an operating rod 55, which is connected to a crank 54, also connected to the shaft 53. An operating rod 55 extends through the end wall 11 of the casing, at which point a stuffing box 56 may be provided. The operating rod is connected to the crank 54, and it will be obvious that either a push or a pull will rock the shaft 53, and the crank 52, to slide the collar 51, respectively to the left or right depending upon the force exerted upon the operating rod 55.

Within the chamber 34, and preferably at a point between the two series of ports 40, and 42, there is a bushing 57, having a reduced passage 58. A needle valve 59, has a tapered end for reception in the reduced passage 58, to close the same. This needle valve is maintained normally in passage closing position by means of a coil spring 60, interposed between a shoulder 61, on the needle valve and a plug 62, threaded in the countershaft 26, at 63. By adjustment of the plug 62, the tension of the spring 60, may be varied to determine the pressure at which the needle valve will unseat to open the passage 58.

The reference characters 70, 80 and 90, designate housings which are freely rotatable about the countershaft 26, these several housings being mounted upon roller bearings 71. Each of these housings is provided with a plurality of open ports 72, which establish communication between the interior of the housings and the interior of the casing 10.

Secured to the housing 70, there is a gear 73, and this gear meshes with a gear 74, keyed to the driven shaft 19. On one side of the housing 80, there is a gear 75, which meshes with a gear 76, loosely mounted on the driven shaft 19, and held in position between a collar 77, and one end of a spacing sleeve 78. Upon the other side of the housing 80, there is a gear 79, which meshes with a gear 81, also loosely mounted on the driven shaft 19, and retained between the opposite end of the spacing sleeve 78, and a collar 82. These gears may be selectively operatively connected to the driven shaft 19, by a clutch collar 83, which is moved along the driven shaft 19, by a crank 84, operated by a shaft 85. The clutch collar 83, is of the overrunning type, it being recessed as at 86, in which is mounted a roller 87. The rear wall of the recess 86, is inclined in such a manner that the speed of the shaft 19, may exceed that of the clutch collar 83. When, however, the speed of the clutch collar 83 exceeds that of the driven shaft 19, a wedging or biting action between the roller 87, the clutch collar 83, and the shaft 19, will result and the shaft will be driven. The shaft 85, by which the crank 84 is operated, is rocked by a hand lever 86, which when in the position A, in Figure 1, moves the clutch collar 83 into operative driving connection with the gear 76. When the lever 86 is in the position designated B, in said figure, the clutch collar 83 will be in its neutral position, the clutch collar 83 being operatively connected with the gear 81, when the lever 76, is in the position C. Secured to the housing 90, there is a driving sprocket 103, and carried by the driven shaft 19, in alinement with the driving sprocket 103, there is a driven sprocket 104, which is keyed to the shaft 19. Passing around these sprockets there is a driving chain 105.

Mounted in each of the housings 70, 80 and 90, there is a fluid circulating device, and these fluid circulating devices are numbered respectively 100, 101, and 102.

The fluid circulating device 100 consists of a main body portion, (see Figure 6) 106, which is circular in form. This main body portion is keyed to the countershaft 26, and is concentric therewith. At that point where it engages the countershaft 26, it is formed with an annular chamber 107, and the ports 37, of the countershaft 26, establish communication between the chamber 33 of the countershaft, and the chamber 107, as is more clearly shown in Figure 2. The body portion 106, of the fluid circulating device 100, is relatively thick and is provided with two series of fluid impelling pistons. In the present embodiment of the invention, each series of fluid impelling pistons includes three pistons which are spaced 120°, thereby distributing them equally around the circumference of the fluid impelling device. By reference to Figure 6, it will be apparent that the fluid impelling pistons of each series are arranged centrally with respect to those of the other series thus insuring proper balance in the body portion of the fluid impelling device.

Inasmuch as these fluid impelling pistons are all of the same construction, the description of one will suffice. The fluid impelling pistons are designated 108, and as illustrated in Figure 4, they project slightly from the periphery of the body portion 106. Each piston is provided on its outer end with a roller 109, which has rolling contact with the inner peripheral face of the housing. This inner peripheral face of the housing is provided with two cam tracks 110 and 111, which are excentric with relation to the axis of the countershaft 26, and the housing 70, and as best illustrated in Figures 5 and 6, the high points of these cam tracks 110 and 111, are spaced 180°, or diametrically opposite each other. The rollers 109, of the pistons 108 have rolling engagement with their respective cam track, and although I have elected to show rollers on the outer ends of the pistons, they may be dispensed with entirely or instead, I may employ a ball, or even a curved face shoe upon the ends of the pistons.

Each piston is mounted for reciprocating movement in a cylinder 112, and interposed between the inner end of each piston and a wall of the cylinder in which it is mounted, there is a coil spring 113, which forces the piston outwardly of the cylinder and maintains its outer end in engagement with its respective cam track of the housing. Each cylinder 112, has communication with a chamber 114, by means of a passage 115, and each chamber 115, has communication with the chamber 107, heretofore mentioned, through a passage 116, maintained normally closed by a spring actuated check valve 117.

The outer wall of each of the chambers 114, may be in the form of a plug 118, which has threaded engagement with the body portion 106, of the fluid circulating device. Each of these plugs has a plurality of openings 119, and these openings serve to establish communication between the interior of the chamber 114, and the interior of the casing 10. For controlling this communication between the interior of the chamber 114, and the casing 10, I employ a valve 120, which seats at 121. This valve 120, is carried by a valve stem 122, the inner end of which is mounted in a recess 123, the outer end 124 of the valve stem extending through a spider 125, which bridges the opening 119. A coil spring 126, operates to urge the valve 120, in the direction of the seat and the valve 120, is unseated in a manner to be later described. Upon the interior of the housing 70, there are two cams 127, and they are so arranged that as the fluid circulating device and its housing move relatively to each other, the cam tracks will operate the several valves to move them to open position against the tension of their springs, the springs serving to return the valves to their seated position as the ends 124, of the valve stems pass over the high points 128, of the cams. The cams 127, are so positioned with respect to the cam tracks 110, and 111, that as the latter force the pistons inwardly, the valves will be permitted to close, and when the pistons move outwardly on the suction stroke, the valves will be opened, thereby to permit of free pumping and circulation of the fluid.

The fluid circulating device 101, is substantially the same in construction as the one just described. It does, however, have but one series of fluid impelling pistons instead of two, and is, therefore, smaller than the fluid circulating device 100.

The fluid circulating device 102 has but one fluid impelling piston 108. Diametrically opposed with respect to this piston there is a spring pressed relief valve 130 forced to its seat by a spring 131, the tension of which, and consequently the pressure at which the valve will open, may be adjusted by a threaded plug 132.

I will now describe the operation of the device.

In Figure 2, of the drawings, the several parts are illustrated in their neutral position, that is to say, that although the driving shaft may be operating with the parts in the position in which they are shown in said figure, there will be no driving of the driven shaft.

The driving shaft being rotated in the direction of the arrow D, the countershaft 26 will be driven through the medium of the meshing gears 15 and 31. Rotation of the countershaft 26, drives the several fluid circulating devices in the manner described, it being understood that the casing 10, is filled to approximately the level E, with oil or other suitable fluid. The several ports 39, 40, and 42, being open, the fluid is permitted to circulate freely and there will be no locking of the gears to effect a driving of the driven shaft 19.

To effect a driving of the driven shaft 19, in the forward direction, the operating rod 55, is moved to the right in Figure 2, rocking the shaft 53, and moving the collar 51, to position to close the ports 40. Immediately the ports 40 are closed, free circulation of the fluid by the fluid circulating device 101, is checked, and consequently, the fluid being non-compressible, a fluid couple is established between the fluid circulating device 101, and its housing 80, and said housing will begin to rotate with the fluid circulating device 101. As the housing 80, rotates, the gear 75, gear 76, and clutch collar 83, will cooperate to drive the driven shaft 19. As the driven shaft 19 rotates, it rotates the housing 70, of the fluid circulating device 100 through the medium of the gears 74 and 73.

Carried by the housing 70, there are a plurality of governors 140, preferably of the centrifugal type and as the housing 70, begins to rotate, these governors 140 operate to move a collar 141, to position to close the ports 39. As soon as the ports 39 are closed, free circulation of fluid by the fluid circulating device 100 is checked. Immediately this takes place, a fluid couple is established between the fluid circulating device 100 and its housing 70, and the housing 70 begins to rotate with the fluid circulating device 100. As the housing 70 rotates, it carries with it the gear 73, which in turn drives the driven shaft 19, through the medium of the gear 74. The ratio of the gears 73 and 74 is such that when the driven shaft 19 is being driven by the gears 73, and 74, its speed is greater than when driven by the gears 75 and 76. Under continued operation, the governors 140 move the collar 141, still further to the left in Figure 2, for the purpose of connecting the driven shaft directly to the driving shaft for driving the driven shaft at high speed.

This direct coupling of the driven shaft with the driving shaft is accomplished in the following manner. The collar 141 has a large flange-like portion 142, which is positioned in an annular groove 143 of a clutch element 144, keyed to the driven shaft 19, and having clutch faces 145. These clutch faces 145 are adapted to engage clutch faces 146 on the driving gear 15, as the member 142 is moved to the extreme left position by the governors 140.

When the driven shaft 19 is driven directly by the driving shaft 14, it is of course driven at its highest rate of speed and consequently, the fluid circulating device 100, since it cannot rotate by reason of the ports 39, being closed, will rotate with the housing 70 as a single unit so long as the driven shaft is driven by direct connection to the driving shaft. If, however, the speed of the driving shaft is reduced, the governors 140, will act to uncouple the direct drive of the driven shaft by the driving shaft, but so long as the ports 39 are maintained closed and free circulation of the fluid by the fluid circulating device 100 is prevented, the driven shaft will be driven by the gears 73 and 74. On the other hand, while this last described condition exists, if the speed of the driving shaft is again materially increased, the direct driving connection will again be automatically established. It is to be understood that as soon as the driving of the driven shaft is started by the gears 73 and 74, the collar 51 will be returned to the position in which it is shown in Figure 2, the ports 40 will be opened and free circulation of the fluid by the fluid circulating device 101 will again be established and the fluid couple between the same and its housing 80, will be destroyed. It is also to be understood that when the driven shaft 19 is driven at high speed by direct connection with the driving shaft 14, the clutch collar 83 permits of the shaft 19 running faster than the gear 76, with which the clutch collar is connected. This is also true if the clutch collar be connected with the gear 81.

In describing the operation thus far, I have assumed that load or road conditions warrant starting in the lowest and therefore, most powerful driving speed. Ordinarily such conditions might not prevail, and under ordinary operating conditions and especially when the device is employed as a speed change or transmission gearing for passenger automobiles where the loads are comparatively light, the normal position of the clutch collar would be in engagement with the gear 81. Under such conditions, initial driving of the driven shaft 19 would be by the gears 79 and 81, in the manner heretofore described.

To drive the driven shaft 19 in the reverse direction, the operating rod 55 is moved to the left in Figure 2, which rocks the crank or lever 54, to move the collar 51 to position to close the ports 42, and when these ports are closed, the free circulation of fluid by the fluid circulating device 102 is checked, and a fluid couple is established between the fluid circulating device 102 and its housing 90. When the fluid couple is established between the fluid circulating device 102 and its housing 90, the housing is driven, driving the sprocket 103, and through the medium of the chain 105, and sprocket 104, the driven shaft is rotated in the opposite direction to that in which it is driven by either the direct drive or the gears 73, 75 or 79.

The invention is herein illustrated as embodied in a transmission gearing for motor vehicles, and in Figure 1, I have illustrated in a somewhat diagrammatic manner, an arrangement of parts whereby the operating rod 55 may be operated. In such an embodiment of the invention, a foot pedal 150, which would replace the ordinary clutch pedal, would be employed. This foot pedal 150, is pivotally mounted as at 151, and has an elongated eye or link 152, which extends to points upon opposite sides of the pivotal point 151. The foot pedal may be connected to the operating rod 55 by a link 153, one end 154 of which operates in the eye or link 152, of the foot pedal 150, the other end being pivotally connected to the operating rod 55, as at 155. With these parts in the position in which they are shown in Figure 1, pressure upon the foot pedal 150 will effect a movement of the operating rod 55, to the right and move the collar 51 to position to close the ports 40, to effect driving in the forward direction. To move the collar 51 to position to close the ports 42 to drive in the reverse direction, the end 154, of the connecting rod 153, is moved to the upper end of the link 152, in which position, pressure applied to the foot pedal 150, exerts a pull upon the operating rod 55, which will move the collar 51 to position to close the ports 42. The end 154 of the connecting rod may be moved to the upper portion of the link 152, by a rod 156, operated by a crank 157, operated by a lever 158.

In automobile installations, I also provide a construction whereby free wheeling may be had, and I will now describe this particular phase of the invention.

Referring to Figure 2 of the drawings, the reference character 160 designates a pipe line which is connected to the fuel line at any suitable point between the carburetor and the motor, preferably the intake manifold of the motor. This line is provided with a suitable valve 161, by which it may be rendered inoperative. This line 160 leads to a cylinder 162, in which there is a piston 163, having a relatively long piston rod 164, which preferably extends through a supporting block or bearing 165. This piston rod operates an arm 166, which in turn operates the collar 43. Interposed between the arm 166, and the bearing block 165, I employ a coil spring 167, which tends at all times to hold the parts in the position in which they are shown, that is with the collar 43 closing the ports 35 and 36.

If now, with the transmission driving in the forward direction in high speed and the fuel supply to the motor is suddenly cut off, the vacuum in the intake manifold operates upon the piston 163, assuming, of course, that the valve 161 is open, and moves the piston to the left in Figure 2. This action moves the arm 166 to the left in Figure 2, moving the collar 43 to position where it opens the ports 35 and 36. Immediately these ports are opened, the fluid may be circulated freely through the chambers 33 and 34, and the casing 10, thus breaking the fluid couple between the fluid circulating devices and their housings, and permitting the entire mechanism to idle. Immediately the vacuum in the cylinder 162 is relieved or destroyed, as by opening up the fuel line to the motor, the spring 167 moves the arm 166 to the right, and moves the collar 43 to position to close the ports 35 and 36, and re-establish the fluid couple between the fluid circulating devices and their housings and rendering the entire mechanism again effective to drive the driven shaft 18.

The check valve 46 acts as a relief valve should undue strain be placed upon the driven shaft during driving of the device by the fluid couple between the fluid circulating device 100 and its housing. The needle valve 59 serves the same purpose when the driving connection consists of a fluid couple between the fluid circulating device 101, and its housing 80, while the check valve 130 serves the same purpose in connection with the fluid circulating device 102 and its housing 90.

One good example of an undue strain which would cause operation of any of these relief valves is as follows: Assuming that the driven shaft is being driven by the fluid couple between any one of the fluid circulating devices and its housing, and the operator should suddenly speed up the motor. In most ordinary transmission gearings, this causes uneven transmission of power or "bucking", as it is sometimes called. In the present device, however, this sudden speeding up of the motor merely drives the fluid circulating devices more rapidly, which, while it tends to rapidly build up pressure, the same is relieved by the proper relief valve and jerky application of power and consequently "bucking" is eliminated.

From the foregoing it will be readily apparent that the present invention provides a novel transmission mechanism which is highly efficient, which is selective in the low and reverse speeds, and which is automatic in the high speed, in which "bucking" is automatically eliminated, and in which the ordinary gear shift lever is eliminated.

While the invention is herein illustrated as embodied in a transmission mechanism for automotive vehicles having four speeds forward, and one reverse speed, it is to be understood that the invention is not to be limited to transmissions of any particular type and may be embodied in many other forms than the one herein illustrated without departing from the spirit of the invention.

Having thus described the invention, what is claimed as new and what it is desired to secure by Letters Patent of the United States, is:

1. A transmission gearing comprising a casing, a fluid contained in said casing, a driving shaft extending into the casing, a hollow countershaft mounted in the casing, said hollow countershaft having ports for establishing communication between the interior of the casing and the interior of the hollow countershaft, means for driving said countershaft from the driving shaft, a driven shaft, intermeshing gears carried by the countershaft and the driven shaft, means carried and operated by the countershaft for circulating fluid through the casing and the ports of the hollow countershaft, said fluid circulating means forming the means for maintaining said gears on the countershaft and means carried by said countershaft and selectively operable to close the ports thereof for interrupting the free circulation of said fluid thereby to prevent operation of the fluid circulating means and establish a fluid couple between the fluid circulating means and certain of the gears carried by the countershaft to drive the driven shaft.

2. A transmission gearing comprising a casing, a fluid contained in said casing, a driving shaft extending into the casing, a hollow countershaft mounted in the casing, said hollow countershaft having ports for establishing communication between the interior of the casing and the interior of the hollow countershaft, means for driving said countershaft from the driving shaft, a driven shaft, intermeshing gears carried by the countershaft and the driven shaft, means carried and operated by the countershaft for circulating fluid through the casing and the ports of the hollow countershaft, said fluid circulating means forming the means for mounting said gears on the countershaft and means for interrupting the free circulation of said fluid thereby to prevent operation of the fluid circulating means and establish a fluid couple between the fluid circulating means and certain of the intermeshing gears to drive the driven shaft from the countershaft, said last mentioned means being carried by the countershaft and movable therealong to close selectively the ports of the hollow countershaft.

3. A transmission gearing comprising a casing, a fluid carried in said casing, a driving shaft extending into said casing, a hollow countershaft mounted in said casing, said hollow shaft having a plurality of ports for establishing communication between the interior of the countershaft and the interior of the casing, means for continuously driving said countershaft from the driving shaft, fluid impelling means for circulating the fluid in the casing through the hollow countershaft and the ports thereof, driving gears carried by the fluid impelling means freely rotatable upon the countershaft, a plurality of driven gears carried by the driven shaft, means for operatively connecting the last mentioned gears to the driven shaft, and means comprising sleeves selectively movable along the countershaft to close the ports of the countershaft, to selectively close the same to prevent free circulation of the fluid through the hollow countershaft and to thereby render the fluid circulating means inoperative as such, and to thereby establish a fluid couple between the fluid circulating means and certain of the driving gears to selectively render the driving gears of the countershaft operative thereby to drive the gears of the driven shaft.

4. A transmission gearing comprising a casing, a fluid carried in said casing, a driving shaft extending into said casing, a hollow countershaft mounted in said casing, means for continuously driving said countershaft from said driving shaft, a driven shaft, means for circulating the fluid in the casing through said hollow countershaft said means including a plurality of housings freely mounted on the countershaft, a driving gear carried by each of said housings, said countershaft being provided with ports to permit of free circulation of the fluid, manually operated means for selectively closing the ports of the hollow countershaft to interrupt the free circulation of fluid through the countershaft to thereby selectively connect the gears loosely mounted thereon to the countershaft to be driven thereby, a driven shaft, gears carried by the driven shaft and meshing with the gears carried by the countershaft to drive the driven shaft when the gears on the countershaft are operatively connected thereto, and automatically operating means for connecting the driven shaft directly with the driving shaft.

5. A transmission gearing comprising a casing, a fluid contained in said casing, a driving shaft extending into said casing, a hollow countershaft mounted in said casing, said countershaft having ports for establishing communication between the interior of the countershaft and the interior of the casing, means for continuously driving the countershaft from the driving shaft, a plurality of housings freely rotatable upon said countershaft, ports for establishing communication between the interior of said housings and the interior of the casing, a driving gear carried by each of said housings, a fluid circulating means mounted in each of said housings and driven by the countershaft for circulating fluid through the hollow countershaft, the casing and the housings, and means for selectively closing the ports of the hollow countershaft to prevent free circulation of the fluid by the fluid circulating means to establish a fluid couple driving connection between the fluid circulating means and the housing to operate the driving gear carried by the housing.

6. A transmission gearing comprising a casing, a fluid contained in said casing, a driving shaft mounted in said casing, a countershaft mounted in said casing, said countershaft being hollow and having ports for establishing communication between its interior and the interior of the casing, a driven shaft mounted in the casing, means for continuously driving the countershaft from the driving shaft, a plurality of housings freely rotatable upon said countershaft, the interior of said housings having communication with the interior of the casing, a driving gear carried by each of said housings, a plurality of gears carried by said driven shaft, and arranged thereon in such a manner that there is one gear meshing with a driving gear carried by a housing on the countershaft, a fluid circulating device mounted in each of said housings and operably connected to and rotatable with the countershaft, means carried by each of said housings for operating a fluid circulating device within the housing to circulate the fluid contained in the casing, through the hollow countershaft, the casing and the several housings, means for selectively checking the free circulation of fluid by said fluid circulating devices and thereby establish a fluid couple between a fluid circulating device and the housing in which it is mounted to drive the housing and its respective fluid circulating device as a unit and thereby drive the driven shaft by the gear carried by the housing, and governor controlled means for effecting a direct driving connection between the driving shaft and the driven shaft.

7. A transmission mechanism comprising a casing, a fluid carried in said casing, a driving shaft, a driven shaft, a countershaft, means for continuously driving the countershaft from the driving shaft, a plurality of driving gears freely rotatable on the countershaft, a plurality of gears carried by the driven shaft and meshing with the gears carried by the countershaft, means for establishing a fluid couple between the gears freely rotatable on the countershaft and the countershaft, thereby to drive the driven shaft from the countershaft and means for effecting a direct driving connection between the driving shaft and the driven shaft, said last mentioned means being automatic in its operation and controlled by the speed of the driven shaft.

LOUIS NIKA.